2,980,487
PRINTING PASTE FOR TEXTILE FABRIC

Robert Johnson Summerill, Westville, N.J., assignor to E. I. du Pont de Nemours and Company, Wilmington, Del., a corporation of Delaware No Drawing. Filed July 25, 1958, Ser. No. 750,863

6 Claims. (Cl. 8—70)

This invention deals with a novel and improved printing process and printing paste in which an alcohol-soluble phthalocyanine precursor is printed onto textile fabric and subsequently developed on the fabric to produce a bright, light-fast and extremely wash-fast print.

In printing textile fabric with pigments, such as vat dyes, various practical problems arise such as speed of the printing process, sharpness of definition of the printed pattern, and fastness to crocking. In recent years a new method for printing fabric with vat dyes has been developed which overcomes the above problems to a satisfactory degree. The principal characteristics of this new method reside in the use of a water-in-oil emulsion to form the body of the printing paste, in the use of an alkali-permeable alkyd resin together with pine oil as emulsifying agent for producing said emulsion, and in subjecting the printed fabric, after drying, to the action of an alkaline reducing bath followed by steaming to vat the imprinted color, and then subjecting the fabric to the action of an oxidizing bath to develop the printed pattern.

By alkali permeable alkyd resin is meant an alkyd resin which is readily permeated or dissolved by the caustic alkali reducing solution used in the printing process. This resin is preferably a modified alkyd resin which is soluble in aqueous alkaline reducing solutions at 212° F. The advantage of using such a resin is that while acting as a bonding agent during the printing step, the resin will be removed by the heated caustic solution on the textile as it passes through the steaming step.

In recent years, a new class of coloring matter has been developed, referred to generally as alcohol-soluble phthalocyanine precursors and the most popular commercial representative of which is copper phthalocyanine precursor.

The precursor for a metal-phthalocyanine may be defined as an alcohol-soluble complex compound, containing more than 4 phthalonitrile units per molecule and which has no tinctorial qualities in itself, but which upon heating or upon being treated with reducing agents yields a metal-phthalocyanine. In the case of copper-phthalocyanine precursor, the compound may be expressed by the empirical formula $Cu(C_8H_4N_2)_6 \cdot NH$, wherein the six units in parentheses may be looked upon as phthalonitrile units, the precursors being in fact capable of being formed by reacting 6 moles of phthalonitrile with 1 mole of a cupric salt in an inert organic solvent saturated with ammonia. Further details on these compounds and their mode of manufacture may be found in U.S. Patents Nos. 2,772,283, 2,772,284 and 2,772,285. A precursor for producing metal-free phthalocyanine is described and claimed in U.S. Patent No. 2,681,348.

Now, because the phthalocyanine precursors are generally developed by treatment with a reducing bath and heating, it would appear off hand that, except for omitting the oxidizing step, the aforementioned water-in-oil emulsion technique should be well adapted to the printing of textile fabric with the mentioned alcohol-soluble phthalocyanine precursors. Moreover, since it is sometimes desirable to shade the phthalocyanine colors with vat dyes, it would seem that the aforementioned novel printing process, including the oxidizing step, should be directly adaptable to the printing of fabric with mixtures of phthalocyanine precursors and vat dyes.

However, the phthalocyanine precursors are not soluble in water. They require an alcohol for putting them into solution, and the ones commonly used in commercial processes with these coloring agents are the lower monoalkyl ethers (methyl to butyl) of ethylene glycol and of diethylene glycol. To typify commercial practice, the monoethyl ether of diethylene glycol ("Carbitol") and copper-phthalocyanine precursors will be selected for all further discussion which follows, but it will be understood that my invention is not limited to these specific agents.

Now, the attempt to apply the aforementioned water-in-oil printing technique to copper phthalocyanine precursor has been disappointingly thwarted by the fact that the "Carbitol" employed for dissolving the precursor has a strong tendency to break up the water-in-oil emulsion, with the result that the printing paste either cannot be prepared at all or is so unstable as not to be useable in ordinary practice.

It is accordingly an object of this invention to provide a novel water-in-oil emulsion printing paste for phthalocyanine precursors which has sufficiently good stability for practical purposes. It is a further object of this invention to provide novel printing paste formulations of phthalocyanine precursors which impart exceedingly bright shades to the printed textile and which give prints of exceptionally good light-fastness, wash-fastness, and resistance to crocking. Other objects and achievements of this invention will appear as the description proceeds.

Now, I find that the above-mentioned destructive tendency of the "Carbitol" on the water-in-oil emulsion can be overcome by incorporating into the emulsion, prior to entry of the Carbitol-precursor solution, a stabilizing composition comprising both ethyl cellulose and an aliphatic alcohol of 6 to 8 C-atoms which is sparingly soluble in water (not over 2% by weight). As practical examples of the latter may be named methylamyl alcohol (4-methylpentanol-2), 2-methylpentanol-1, 2-ethylbutanol, n-hexanol and heptanol-3.

The quantity of the stabilizing composition required for satisfactory results is not very great. It may vary from 0.15 to 0.30 part of ethyl cellulose and from 0.5 to 2.0 parts of the sparingly soluble alcohol per 100 parts of the ultimate printing paste. The two agents are preferably dissolved in xylene (from 0.5 to 4.0 parts per 100 parts of printing paste), and are stirred into the oily phase together with a solution of the alkali-permeable alkyd resin in xylene, prior to entry of the water, which step in turn precedes the addition of the precursor-Carbitol solution.

In general, my preferred procedure in preparing the printed paste is as follows:

(a) ALKYD RESIN CONCENTRATE

An alkali permeable alkyd resin, usually in the form of a xylene solution, is mixed with pine oil and then an aqueous solution of diammonium phosphate is added as the mass is vigorously agitated to prepare the alkyd resin emulsion. As a convenient example of this type of alkyd resin, mention may be made of an alkyd resin now on the market made by using approximately 42% phthalic anhydride and 37% cotton seed oil, the balance being the conventional polyhydric alcohol such as glycerine, glycol, etc.

The proportions of the several ingredients in this step of the process are preferably as follows:

| | Total parts |
|---|---|
| Alkyd resin _____ 36 parts | 60 |
| Xylene _____ 24 parts | |
| Pine oil _____ | 12 |
| Diammonium phosphate _____ 3 parts | 28 |
| Water _____ 25 parts | |
| Total _____ | 100 |

(b) STABILIZER SOLUTION

This is prepared by mixing together ethyl cellulose, methylamyl alcohol and xylene in the proportions indicated above. A clear solution is obtained.

(c) HYDROCARBON OIL

This is generally selected from existing commercial mixtures of aliphatic, cycloaliphatic and aromatic oils which are liquid within the range of room temperature to 105° C. (the minimum steaming temperature). As convenient examples of such an oil may be named the following two commercial hydrocarbon oils, whose constitutions are as indicated:

| Hydrocarbons | Amsco No. 46, Percent | Varsol No. 2, Percent |
|---|---|---|
| Paraffinic | 58 | 31.0 |
| Naphthenic | 23 | 34.5 |
| Aromatic | 19 | 34.5 |

(d) WATER-IN-OIL EMULSION (SO-CALLED "CLEAR")

The aforegoing three compositions are put together in the following proportions:

| | Parts |
|---|---|
| Alkyd resin concentrate (a) | 2.5 to 7.5 |
| Stabilizer solution (b) | 1.5 to 2.5 |
| Hydrocarbon oil (c) | 26 to 45 |
| Total | 30 to 55 |

The mixture is stirred in a homogenizer type mixer and water is fed in gradually until an emulsion of desired consistency has been obtained. Customarily, the water added will be in the following proportion:

| | Parts |
|---|---|
| Mixture of (a), (b) and (c) | 30 to 55 |
| Water | 48 to 14 |
| Total "clear" | 78 to 69 |

(e) COLORING SOLUTION

The selected precursor is dissolved in the chosen solvent (usually "Carbitol") in the following proportions:

| | Parts |
|---|---|
| Precursor | 0.04 to 20 |
| Solvent | 99.96 to 80 |
| Total | 100.00, 100 |

(f) FINAL PRINTING PASTE

To the emulsion obtained in step (d), while still in the homogenizer, the coloring solution (e) is added in the following proportion:

| | Parts |
|---|---|
| The "clear" | 78 to 69 |
| Coloring solution | 22 to 31 |
| Total | 100, 100 |

Stirring in the homogenizer is continued until a homogeneous paste is obtained.

The quantity of coloring agent added in step (f) and the proportion of phthalocyanine precursor in step (e) are generally correlated so that the quantity of "Carbitol" in the final printing paste shall be not less than 20% by weight. Thus, with a coloring composition containing over 99% by weight of the solvent, any quantity thereof from 22 to 31 parts when used in step (f) will satisfy the requirement. On the other hand, if the quantity of solvent in (e) is but 80%, at least 25 parts thereof are added in step (f).

The final printing paste then is essentially a copper phthalocyanine precursor solution dispersed in a stable water-in-oil emulsion. It is significant that unless the ethyl cellulose and methylamyl alcohol are present as pointed out above the print paste composition will not be stable and will therefore not be useful in a commercial printing process. Experiments have proven that in the absence of ethyl cellulose the printing process is inoperable and in the absence of the methylamyl alcohol the stability of the paste is much inferior to the print paste of this invention.

If a vat dye is to be added for shading purposes, it is generally incorporated in the form of an aqueous paste into the final printing paste obtained in step (f). Customarily, jade green (C.I. 1101) or a violet vat dye is employed for this purpose, but other vat dyes may be used if desired. The amount of vat dye used for shading purposes is usually small, in the order of less than 1 percent of the final printing paste (about ½ percent); however, larger amounts of vat dyes may readily be used.

(g) PRINTING PROCEDURE

Printing with the above, novel printing paste is carried out on conventional textile roller printing machines in the conventional manner, and no special precautions are required. After the fabric passes through the machine, the printed textile is dried by passing through an oven or by passing over dry cans. Then it is passed into a pad bath of caustic soda and hydrosulfite. The fabric is then flash-aged by passing through air-free steam for about 30 seconds at temperatures of about 250° F. It is then rinsed, and if vat dye is present, it is taken through an oxidation bath such as sodium dichromate and acetic acid solution, after which the fabric is soaped and dried in the conventional manner.

Without limiting this invention, the following examples are given to illustrate my preferred mode of operation. Parts mentioned are by weight.

Example 1

(A) ALKYD RESIN EMULSION

A mixture of 60 parts of a 60% by weight solution of a cottonseed oil modified alkyd resin in xylene and 12 parts of pine oil were prepared by mixing the ingredients. Then, a solution of 3 parts of diammonium phosphate in 25 parts of water was added and homogenized into the alkyd resin solution resulting in a white viscous paste.

(B) ETHYL CELLULOSE-ALCOHOL SOLUTION

A solution of 8 parts of ethyl cellulose (type N, grade 50) and 22.5 parts of methylamyl alcohol

was dissolved in 55 parts of xylene.

(C AND D) EMULSION CLEAR

A mixture of 75 parts of A, 25 parts of B and 320 parts of hydrocarbon solvent (a commercial mixture of 23% naphthenic, 58% paraffinic and 19% aromatic hydrocarbons, B.R. 105°–300° C.) was prepared and then 500 parts of water slowly added as the mixture was agitated with a homogenizer. A uniform white emulsion was obtained.

(E) PRECURSOR COMPOSITION 20 parts of copper phthalocyanine precursor (Example 3 of U.S.P. 2,772,283) was dissolved in 220 parts of the monoethyl ether of diethylene glycol containing 5 parts of ethylene diamine (to prevent premature development of color).

(F) PRINTING PASTE

Solution E was heated to 110° F. and it was then added to 755 parts of the clear D with vigorous mixing to obtain homogenization.

This olive green paste had an excellent consistency for a printing paste and showed no instability either on prolonged storage or when used on textile printing machines.

(G) PRINTING PROCESS

Bleached cotton fabric was passed through a textile roller printing machine which furnished the above print paste composition by a doctor blade to the engraved roll. The printed cloth was dried by passing through an oven at 160° F. Then the print was developed by passing the printed textile through a reducing pad bath containing caustic and sodium hydrosulfite and then it was passed through an air-free steam atmosphere. The print was then rinsed, washed and dried in the conventional manner.

The final print was a bright blue which shows excellent light and wash-fastness.

When the printing paste of this example was prepared as above but without methylamyl alcohol, the printing paste stability immediately after preparation was inferior to that obtained above, and it became progressively worse on daily inspection.

Example 2

Example 1 was repeated except that the printing paste was shaded with a conventional vat dye. This was done by incorporating 0.67 part of an 11% paste of dimethoxydibenzanthrone to the clear after the precursor solution has been added. The resulting print paste was stable on the printing machine and was used to print cotton fabric as in Example 1, except that after the steaming operation the fabric was rinsed in cold water and the vat dye was oxidized by passing the printed fabric through a bath of sodium bichromate and acetic acid.

The finished fabric was a bright print of a greenish blue which showed excellent sharpness of print and had excellent light and wash-fastness.

It will be understood that the details of procedure may be varied within the skill of those engaged in this art.

I claim as my invention:

1. The process of preparing a stable water-in-oil type printing paste for printing textile fabric with a phthalocyanine precursor, which comprises forming an emulsion of water in oil by the aid of an emulsifier comprising pine oil and an alkali-permeable alkyd resin, further including in said emulsion a stabilizer comprising ethyl cellulose and a sparingly soluble aliphatic alcohol of 6 to 8 C-atoms, and then incorporating into said emulsion a solution of a phthalocyanine precursor in a lower monoalkyl ether of diethylene glycol.

2. A stable printing composition for printing textile fabric with a phthalocyanine precursor, said composition comprising a water-in-oil emulsion containing per 100 parts of total weight, from 2.5 to 7.5 parts of an emulsifier comprising pine oil and an alkali permeable alkyd resin, from 1.5 to 2.5 parts of a stabilizer comprising ethyl cellulose and a sparingly soluble aliphatic alcohol of 6 to 8 C-atoms, from 22 to 31 parts of said phthalocyanine precursor dissolved in a lower monoalkyl ether of diethylene glycol, and from 48 to 14 parts of water, said oil making up the difference and being composed essentially of a mixture of aliphatic, cycloaliphatic and aromatic hydrocarbons which are liquid in the range beween room temperature and 105° C.

3. A process of printing textile fabric, which comprises applying thereto a stable printing paste as defined in claim 2, drying the printed fabric, padding the same in an aqueous reducing bath comprising alkaline hydrosulfite and steaming the padded fabric to develop the printed pattern.

4. A stable printing composition as in claim 2, said composition comprising further a vat dye in quantity not exceeding 1% by weight of the entire printing composition.

5. A process of printing cotton fabric, which comprises applying thereto a stable printing paste as defined in claim 4, drying the printed fabric, padding the same in an aqueous reducing bath comprising alkaline hydrosulfite, steaming the padded fabric, and passing the same through an aqueous oxidizing bath to develop the final printed pattern.

6. A printing composition for textile fabric comprising a water-in-oil emulsion containing, per 100 parts of total weight, from 2.5 to 7.5 parts of an emulsifier comprising pine oil and a cotton-seed-oil modified alkyd resin, from 1.5 to 2.5 parts of a stabilizer comprising ethyl cellulose and a sparingly soluble aliphatic alcohol of 6 to 8 C-atoms, from 22 to 31 parts of copper phthalocyanine precursor dissolved in a lower monoalkyl ether of diethylene glycol, and from 48 to 14 parts of water, said oil making up the difference and being composed essentially of a mixture of aliphatic, cycloaliphatic and aromatic hydrocarbons which are liquid in the range between room temperature and 105° C.

References Cited in the file of this patent

UNITED STATES PATENTS

| | | |
|---|---|---|
| 2,288,261 | Abrams | June 30, 1942 |
| 2,332,121 | Trowell | Oct. 19, 1943 |
| 2,681,348 | Brooks | June 15, 1954 |
| 2,772,283 | Stevenson | Nov. 27, 1956 |
| 2,772,284 | Barnhart et al. | Nov. 27, 1956 |
| 2,878,096 | Wood et al. | Mar. 17, 1959 |

OTHER REFERENCES

Schwartz et al.: "Surface Active Agents," vol. 1, 1949, pp. 214–217, Interscience Publishers, Inc., New York.